H. BÉLIVEAU.
MILK COOLER AND AERATOR.
APPLICATION FILED MAR. 30, 1920.
1,360,869.
Patented Nov. 30, 1920.
2 SHEETS—SHEET 1.
Fig. 1.
Fig. 2.
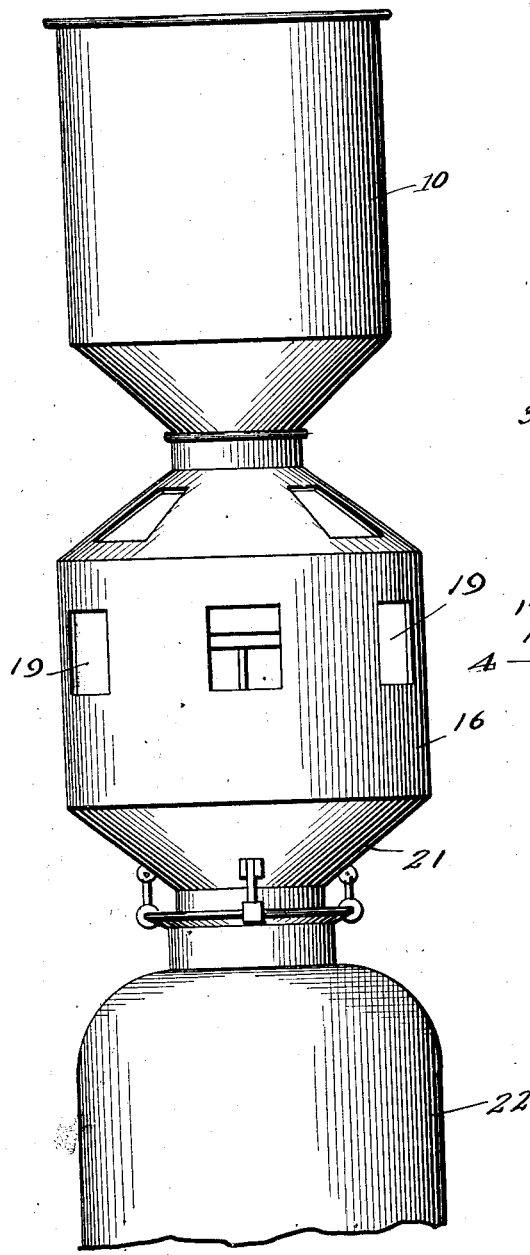
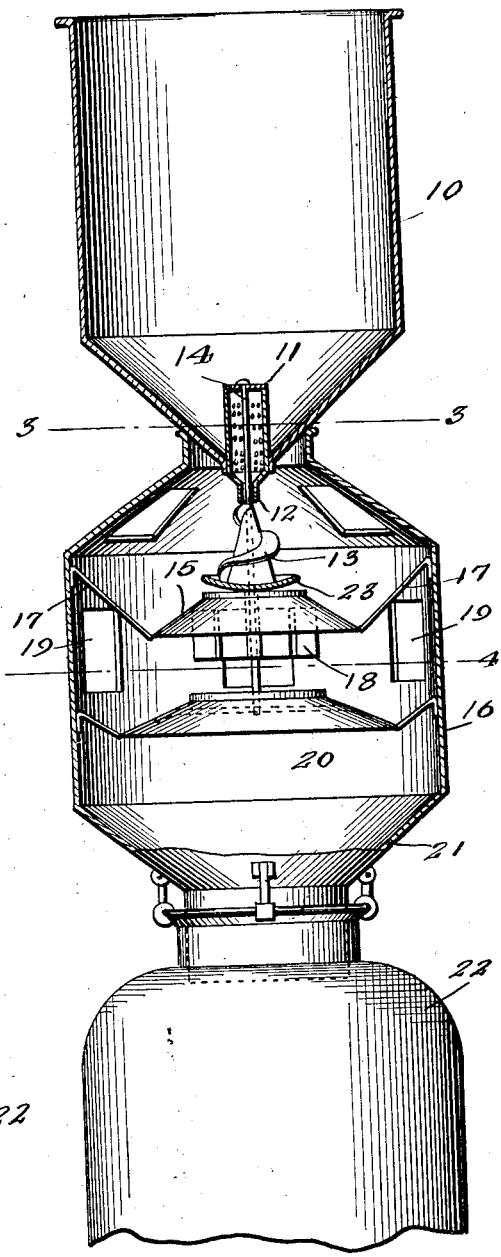
H. Béliveau INVENTOR
BY Victor J. Evans
ATTORNEY
WITNESSES

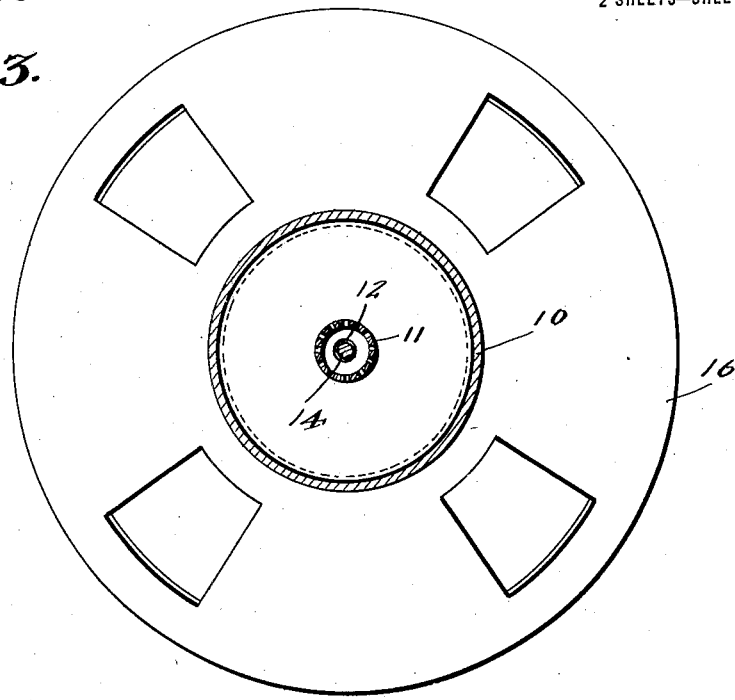
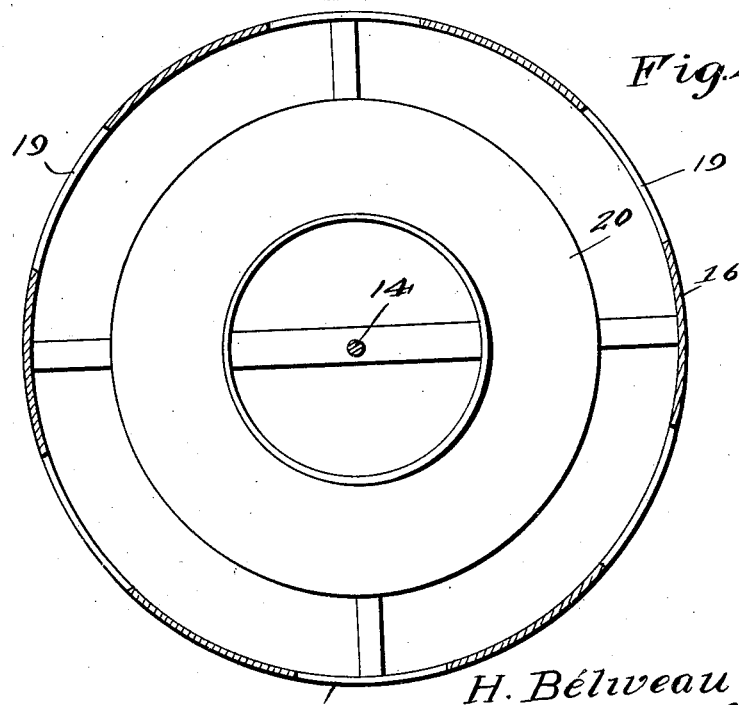

UNITED STATES PATENT OFFICE.

HARMIDOS BÉLIVEAU, OF CONCORD, VERMONT.

MILK COOLER AND AERATOR.

1,360,869. Specification of Letters Patent. Patented Nov. 30, 1920.

Application filed March 30, 1920. Serial No. 369,978.

*To all whom it may concern:*

Be it known that I, HARMIDOS BÉLIVEAU, a citizen of the United States, residing at Concord, in the county of Essex and State of Vermont, have invented new and useful Improvements in Milk Coolers and Aerators, of which the following is a specification.

The object of the invention is to provide a device to be used as a filler for milk cans such as those used for transporting milk in quantity from the producer to the customer or dealer whereby the fresh milk may be treated immediately upon the completion of the milking operation and in the course of introducing it into the cans or vessels for transportation, to remove the animal heat and gases without the necessity of allowing it to stand for a considerable interval as in the usual practice, to permit of reduction by natural means to a proper condition for storage and confinement in the cans, it being a well recognized fact that the premature deposit of the milk in such cans, and the tight closing of the latter to permit of transportation, results in an objectionable deterioration of the milk with the result that it does not reach the consumers in a proper condition for preservation, and hence with the result that it sours prematurely. With this object in view the invention consists in a construction and combination of parts constituting a milk can filler of which a preferred embodiment is illustrated in the accompanying drawings, wherein:

Figure 1 is a side view of the apparatus applied in operative position to a milk can.

Fig. 2 is a vertical central sectional view of the same.

Figs. 3 and 4 are transverse sections on the planes indicated respectively by the lines 3—3 and 4—4 of Fig. 2.

The apparatus consists essentially of a feeder or funnel 10 into which the milk may be poured immediately after the completion of the milking operation and from which it passes through an axial cylindrical screen 11 to a nozzle 12 by which it is deposited upon a spiral propeller 13 mounted upon a spindle 14 arranged axially in the apparatus, a distributing conical deflector 15 being arranged beneath the propeller to receive the liquid therefrom for discharge in a thin film at its periphery. Said deflector may be supported within the casing 16 by means of radial hangers or braces 17 and beneath said deflector is arranged a fan 18 which is carried by the spindle of the propeller and is thereby rotated to create a radiating draft of air which passes through the film of milk discharged from the periphery of the deflector and escapes through outlet openings 19 in the walls of the casing.

Beneath the deflector 15 and also below the fan 18 is arranged a supplemental deflector 20 of larger diameter than the deflector 15 and also of conical form upon which the film of milk falls and from the periphery of which it is finally discharged through the reduced outlet 21 of the casing into the milk can or receptacle 22.

The casing serves as a support for the feed receptacle or funnel 10, so that when the reduced nozzle 21 thereof is inserted in the neck of the milk can, the necessity for a supplemental support is avoided, and the milk may be poured directly into said feed receptacle or funnel and hence passed through the casing and be discharged into the can without further attention upon the part of the operator and without occupying an excessive amount of time such as will serve to interfere with the prompt delivery of the product, and yet during its passage through the apparatus the milk will be purified and cooled so that it may be safely stored in the can and transported under conditions which will secure its delivery in proper condition to the consumer or dealer.

The conical distributing disks which are interposed in the path of the milk in its passage from the propeller to the can 22 serve as baffles to impede its progress and insure a proper distribution thereof to permit of proper aeration without such agitation as to involve the rupture of the fat globules and hence without affecting the structure of the milk, and it will be observed that the power necessary for actuating the aerating fan is derived from the gravity of the milk in its passage along the surface of the spiral blade of the propeller as it is discharged from the nozzle 12 after passing through the screen 11.

The compactness of the apparatus permits of the arrangement thereof successively upon a number of cans to be filled, and in order that the distribution of the milk in its passage through the device may be rendered more effective, the propeller may be provided at its bottom as shown with a dished distributing disk 23 which is upwardly concaved and over the periphery of which the liquid passes before falling upon the convexed upper surface of the upper deflector 15.

Having described the invention what is claimed is:—

A milk aerating and cooling apparatus for use in connection with milk cans comprising a feed funnel, provided with an axial cylindrical screen and a discharge nozzle, a spiral propeller arranged in the path of discharge from said nozzle, upper and lower conical deflectors arranged in the path of milk discharged from the propeller, a fan arranged between said deflectors and actuated by the propeller for discharging air radially through the film of milk in its passage from one deflector to the other.

In testimony whereof I affix my signature.

HARMIDOS BÈLIVEAU.